US008922834B2

(12) United States Patent
Chandu et al.

(10) Patent No.: US 8,922,834 B2
(45) Date of Patent: *Dec. 30, 2014

(54) HYBRID HALFTONE GENERATION MECHANISM USING CHANGE IN PIXEL ERROR

(75) Inventors: Kartheek Chandu, Longmont, CO (US); Mikel J. Stanich, Longmont, CO (US); Chai Wah Wu, Hopewell Junction, NY (US); Barry M. Trager, Yorktown Heights, NY (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 274 days.

This patent is subject to a terminal disclaimer.

(21) Appl. No.: 13/440,820

(22) Filed: Apr. 5, 2012

(65) Prior Publication Data

US 2013/0265611 A1    Oct. 10, 2013

(51) Int. Cl.
*G06K 15/00*   (2006.01)
*G03G 15/01*   (2006.01)
*G06K 9/40*    (2006.01)
*G03G 13/04*   (2006.01)

(52) U.S. Cl.
USPC .......... 358/3.06; 358/534; 399/180; 382/275; 347/131

(58) Field of Classification Search
None
See application file for complete search history.

(56) References Cited

U.S. PATENT DOCUMENTS

| 5,805,734 | A  | * | 9/1998  | Ebner ............................ 382/237 |
| 6,563,957 | B1 | * | 5/2003  | Li et al. ......................... 382/252 |
| 6,917,443 | B1 |   | 7/2005  | Wang |
| 7,453,604 | B2 | * | 11/2008 | Eschbach et al. ............. 358/3.06 |
| 8,610,962 | B2 | * | 12/2013 | Fischer et al. ................ 358/3.26 |
| 2004/0169872 | A1 | | 9/2004  | Maurer |
| 2004/0233477 | A1 | | 11/2004 | Stanich et al. |
| 2009/0046850 | A1 | | 2/2009  | Au et al. |
| 2009/0097052 | A1 | | 4/2009  | Kawamura |
| 2010/0045722 | A1 | | 2/2010  | Chandu et al. |
| 2011/0142340 | A1 | | 6/2011  | Guo et al. |
| 2013/0201528 | A1 | * | 8/2013  | Morisse ......................... 358/3.1 |

OTHER PUBLICATIONS

Gooran, Sasan, "A Novel Hybrid Amplitude Modulated/Frequency Modulated Halftoning Based on Multilevel Halftoning", *Journal of Imagining Science and Technology*, vol. 50, No. 2, (Apr. 2006), 1-25.
Lee, Changhyung, et al., "The Hybrid Screen-Improving the Breed", *SPIE-IS&T/* vol. 6493 649318-1, 12 pages.

* cited by examiner

*Primary Examiner* — Steven Kau
(74) *Attorney, Agent, or Firm* — Blakely, Sokoloff, Taylor & Zafman LLP

(57) ABSTRACT

A method is disclosed. The method includes generating a Continuous Tone Image (CTI) with all pixel values same as a first gray level, generating an initial Half Tone Image (HTI) with all pixel values equal to minimum absorptance level and computing a change in pixel error for a first pixel. The change in pixel error is computed by identifying a first pixel indicated in a valid pixel map, toggling the first pixel with all the possible output states and swapping the first pixel with all neighbor pixels only if the stacking constraint is satisfied, updating the HTI with the maximum error decrease operation and continue to next pixel location till the end criteria is met.

23 Claims, 8 Drawing Sheets

HYBRID HALFTONE GENERATION MECHANISM USING CHANGE IN PIXEL ERROR

FIELD OF THE INVENTION

The invention relates to the field of image reproduction, and in particular, to digital halftoning.

BACKGROUND

Digital halftoning is a technique for displaying a picture on a two-dimensional medium, in which small dots and a limited number of colors are used. The picture appears to consist of many colors when viewed from a proper distance. For example, a picture consisting of black and white dots can appear to display various gray levels. Digital printers, which were initially pure black and white machines with a very coarse resolution, have evolved to accommodate colors, finer resolutions, and more recently, more than one bit of information per pixel (referred to as "multi-bit" or "multi-tone").

Screening is a type of halftoning method used commonly in practical implementations. A binary screening method employs a 3D Look-Up table (LUT) replicated to the size of printable area containing the binary output values for every PEL of the array and for every gray level of the device. These replicated LUTs are indexed by the Continuous Tone Image (CTI) data to determine which PELs are ON or OFF. A print controller receives a CTI, such as a digital picture, from a host. The print controller then uses the screening algorithm to process the CTI and convert the image into an array of pixels. The result of the screening algorithm is a bitmap where each pixel may be ON or OFF, which is referred to as a Half-Tone Image (HTI). The print controller then sends the HTI to a print engine for printing.

Conventional digital halftoning techniques are designed as a function of either the dot size [amplitude modulation (AM)] or the dot density [frequency modulation (FM)]. Generally, AM halftoning methods have the advantage of low computation and good print stability for electro photographic printers, while FM halftoning methods typically have higher spatial resolution and resistance to moiré artifacts and are used in inkjet printers.

New classes of AM/FM (e.g., hybrid) halftoning algorithms exist that simultaneously modulate the dot size and density. The major advantages of hybrid halftoning are stable as AM halftones, moiré resistance as FM methods through irregular dot placement, and improved quality through systematic optimization of the dot size and dot density at each gray level.

With the prevalence of devices having multi-bit capability there is a potential to improve overall image quality of print jobs using multi-bit halftoning. Multi-bit screening enables a selection among multiple drop sizes or exposure levels at each addressable pixel. The 3D LUT approach can be extended to represent multibit drop sizes or exposure values by using these values in the LUT instead of binary values.

The planes of the 3D Look-Up Table (LUT) form a 3D array having planes representing the halftone patterns for each darker gray level, ranging from the pattern for gray level zero through the maximum gray level of the halftone mask. The maximum gray level is used to produce a solid, where all of the pixels are printed at the maximum output state.

Accordingly, an algorithm to efficiently generate multi-bit hybrid halftone screens is desired.

SUMMARY

In one embodiment, a method is disclosed. The method includes generating a Continuous Tone Image (CTI) with all pixel values same as a first gray level, generating an initial Half Tone Image (HTI) with all pixel values equal to minimum absorptance level and computing a change in pixel error for a first pixel. The change in pixel error is computed by identifying a first pixel indicated in a valid pixel map, toggling the first pixel with all the possible output states and swapping the first pixel with all neighbor pixels indicated in a valid pixel map only if the stacking constraint is satisfied, updating the HTI with the maximum error decrease operation and continue to next pixel location till the end criteria are met.

In a further embodiment, a system is disclosed. The system includes a processor to generate a Continuous Tone Image (CTI) with all pixel values same as a first gray level, generate an initial Half Tone Image (HTI) with all pixel values equal to minimum absorptance level and compute a change in pixel error for a first pixel by identifying a first pixel indicated in a valid pixel map, toggling the first pixel with all the possible output states and swapping the first pixel with all neighbor pixels indicated in a valid pixel map only if the stacking constraint is satisfied, updating the HTI with the maximum error decrease operation and continue to next pixel location till the end criteria are met.

BRIEF DESCRIPTION OF THE DRAWINGS

A better understanding of the present invention can be obtained from the following detailed description in conjunction with the following drawings, in which.

DETAILED DESCRIPTION

A direct multi-bit search hybrid halftone mechanism is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
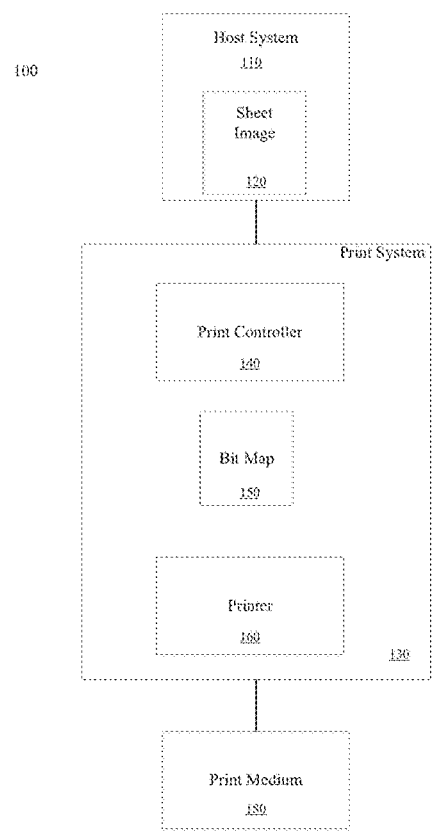
FIG. 1 illustrates one embodiment of a printing network.

FIG. 1 is a block diagram illustrating a printing network 100. Network 100 includes a host system 110 in communication with a printing system 130 to print a sheet image 120 onto a print medium 180 (e.g., paper) via a printer 160. The resulting print medium 180 may be printed in color and/or in any of a number of gray shades, including black and white.

The host system 110 may include any computing device, such as a personal computer, a server, or even a digital imaging device, such as a digital camera or a scanner. The sheet image 120 may be any file or data that describes how an image on a sheet of print medium should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. In one embodiment, the printing system 130 includes the printer 160 that presents the bitmap 150 onto the print medium 180 (e.g., via toner, ink, etc.) based on the sheet image 120.

Figure 2:
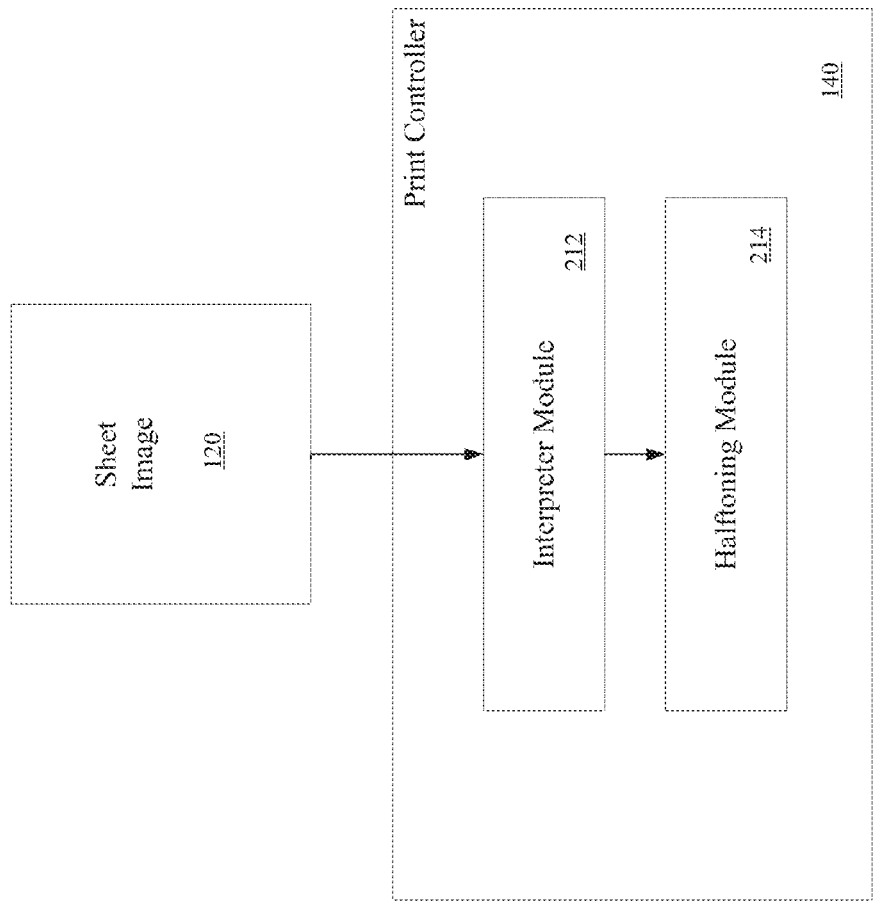
FIG. 2 illustrates one embodiment of a print controller.

The print controller 140 may be any system, device, software, circuitry and/or other suitable component operable to transform the sheet image 120 for generating the bitmap 150 in accordance with printing onto the print medium 180. FIG. 2 is a block diagram illustrating an exemplary print controller 140.

Referring to FIG. 2, the print controller 140, in its generalized form, includes an interpreter module 212 and a halftoning module 214. In one embodiment, these separate components represent hardware used to implement the print controller 140. Alternatively or additionally, the components may represent logical blocks implemented by executing software instructions in a processor of the printer controller 140. Accordingly, the invention is not intended to be limited to any particular implementation as such may be a matter of design choice.

The interpreter module 212 is operable to interpret, render, rasterize, or otherwise convert images (i.e., raw sheetside images such as sheet image 120) of a print job into sheetside bitmaps. The sheetside bitmaps generated by the interpreter module 212 are each a two-dimensional array of pixels representing an image of the print job e.g., a continuous tone image (CTI), also referred to as full sheetside bitmaps.

The two-dimensional pixel arrays are considered "full" sheetside bitmaps because the bitmaps include the entire set of pixels for the image. The interpreter module 212 is operable to interpret or render multiple raw sheetsides concurrently so that the rate of rendering substantially matches the rate of imaging of production print engines.

Halftoning module 214 is operable to represent the sheetside bitmaps as patterns of ink drops or other dots, having one or more different drop of dot sizes. For example, the halftoning module 214 may convert the continuous tone sheetside bitmaps to a pattern of ink drops for application to the print medium 180 (e.g., paper). Once computed, the halftoning module 214 transfers the converted sheetside bitmaps to the print head controllers of the printer 160 to apply the ink drop(s) to the tangible medium 180.

According to one embodiment, halftoning module 214 performs halftoning using a screen generated via a Direct Multibit Search Screen Algorithm (DMSSA). In such an embodiment, the DMSSA optimizes a halftone pattern at each gray level using a suitable filter and selects from among multiple drop sizes that printer 160 is capable of applying to the tangible medium 180. In a further embodiment, the DMSSA screen is generated at host system 100 or another host system in printing network 100. However, the mask may be generated at a third party computer system and transferred to printing network 100.

In one embodiment, the DMSSA is based on the Direct Multi-bit Search (DMS) algorithm which is an extension to Direct Binary Search (DBS) algorithm. The DMS algorithm is an iterative/recursive search heuristic that uses a filter to minimize the perceived error difference ($\epsilon$), between a continuous tone image (CTI) and its corresponding rendered halftone image (HTI). This error is represented as:

$$\epsilon = |h(x,y)^{}g(x,y) - h(x,y)^{}f(x,y)|^2 dxdy,$$

where $**$ denotes 2-dimensional convolution, $h(x,y)$ represents the point spread function (PSF) of the human visual system or other suitable filtering function, $f(x,y)$ is the continuous tone original image and $g(x,y)$ is the halftone image corresponding to the original image, where all image values are assumed to lie between 0 (white) and 1 (black).

The halftone image $g(x,y)$ itself incorporates a printer model.

$$g(x,y) = \Sigma_m \Sigma_n g[m,n] p(x-mX, y-nX),$$

which represents the combination of the digital halftone image $g[m,n]$ with a spot profile $p(x,y)$ having device PEL spacing X, where X is the inverse of the printer addressability DPI. Superposition is assumed in this model for the interaction between overlapping spots. The digital halftone image $g[m,n]$ can have any absorptance value between 0 (white) and 1 (black).

DMS is a computationally expensive algorithm that requires several passes through the halftone image (HTI) before converging to the final HTI. The DMS algorithm starts by generating an initial halftone image, then a local improvement to the halftone image is produced by swapping and toggling, ultimately resulting in an optimized halftone image by selecting the most appropriate swaps and toggles. Where swapping is the operation of switching the absorptance values of nearby pixels and toggling is the operation of changing the absorptance value of individual pixels.

The cost function may be represented as $\epsilon = \langle \tilde{e}, \tilde{e} \rangle$, where $\langle \bullet, \bullet \rangle$ denotes the inner product and $\tilde{e}(x,y) = h(x,y)^{*}(g(x,y) - f(x,y))$ represents the perceptually filtered error. In such an embodiment, the CTI $f(x,y)$ may also be expressed in terms of its samples $f[m,n]$ where $(m,n)$ are coordinate on the halftone array or printer grid. Thus, the perceived error is given by $\tilde{e}(x,y) = \Sigma E_{m,n} e[m,n] p(x-mX, y-nX)$, where $e[m,n] = g[m,n] - f[m,n]$, and $\tilde{p}(x,y) = h(x,y)^{**}p(x,y)$ is the perceived printer spot profile.

Considering the effect of a trial change. The new error will be $\tilde{e}' = \tilde{e} + \Delta\tilde{e}$. Substituting this and expanding the inner product results in $\epsilon' = \epsilon + 2\langle \Delta\tilde{e}, \tilde{e} \rangle + \langle \Delta\tilde{e}, \Delta\tilde{e} \rangle$, assuming all signals are real-values. Either a toggle at pixel $(m_0, n_0)$ or a swap between pixels $(m_0, n_0)$ and $(m_1, n_1)$ can be represented as $g'[m,n] = g[m,n] + \Sigma_i a_i \delta[m-m_i, n-n_i]$. As a result, $$\Delta\tilde{e}(x,y) = \Sigma_i a_i \tilde{p}(x-m_i X, y-n_i X), \text{ and}$$

$$\Delta\epsilon = 2\Sigma_i c\widetilde{pe}\ [m_i,n_i] + \Sigma_{i,j} a_i a_j c\widetilde{pp}\ [m_i-m_j, n_i-n_j], \text{ where}$$

$$c\widetilde{pe}\ [m,n] = \langle \tilde{p}(x,y), \tilde{e}(x+mX, y+nX) \rangle, \text{ and}$$

$$c\widetilde{pp}\ [m,n] = \langle \tilde{p}(x,y), \tilde{p}(x+mX, y+nX) \rangle.$$

According to one embodiment, a model based on mixed Gaussian functions whose functional form is used:

$$c\widetilde{pp}\ [u,v] = k_1 \exp(-(u^2+v^2)/2\sigma_1^2) + k_2 \exp(-(u^2+v^2)/2\sigma_2^2),$$

where $k_1; k_2; \sigma_1; \sigma_2$ are constant values based on empirical analysis to yield desired results. Assuming that $c\widetilde{pp}$ is symmetric, then:

$$\Delta\epsilon = 2(\Sigma_i c\widetilde{pe}\ [m_i,n_i] + \Sigma_{i<j} a_i a_j c\widetilde{pp}\ [m_i-m_j, n_i-n_j]) + \Sigma_i a_i^2 c\widetilde{pp}\ [0,0].$$

Assuming that a given printer can produce S possible output states/drops with absorptance levels $\alpha_1, \alpha_2, \ldots, \alpha_S$ at every PEL location. Then, $a_i$ represents the amount of change in the gray level for toggle as: $a_i = g_{new}[m_i, n_i] - g_{old}[m_i, n_i]$. A swap between pixels i and j is equivalent to two toggles with $g_{new}[m_j, n_j] = g_{old}[m_i, n_i]$ and $g_{new}[m_i, n_i] = g_{old}[m_j, n_j]$. Thus, the amount of change in the gray level for swap is represented as $a_i = g_{old}[m_j, n_j] - g_{old}[m_i, n_i]$ and $a_j = g_{old}[m_i, n_i] - g_{old}[m_j, n_j]$. Then $a_j = -a_i$ except for j=0 (e.g., toggle, $a_0$=0).

Figure 3:
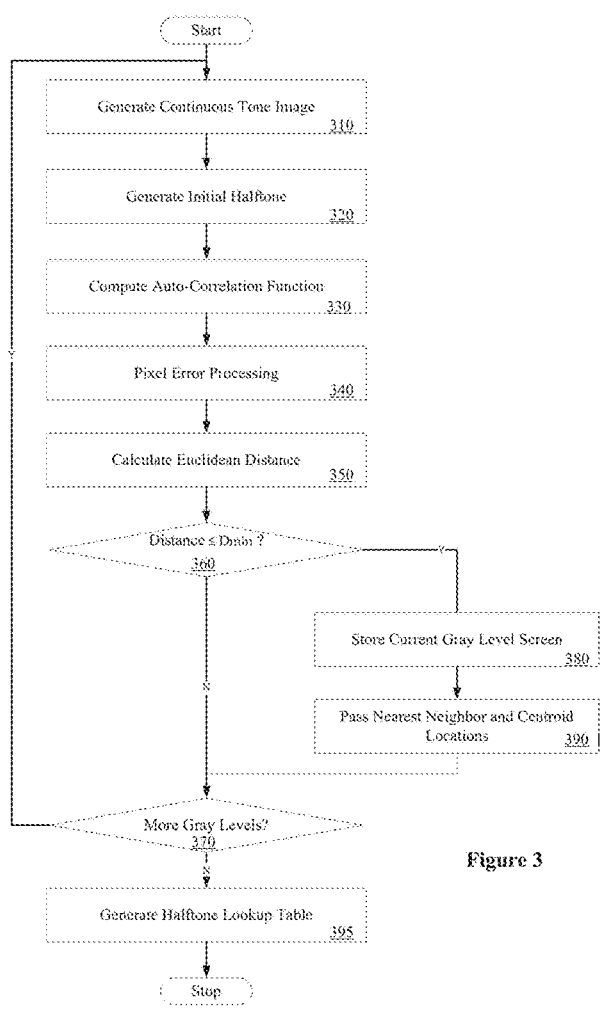
FIG. 3 is a flow diagram illustrating one embodiment of a multi-bit screening process.

FIG. 3 is a flow diagram illustrating one embodiment of a multi-bit screening process using the DMSSA based on $a_i$ and $a_j$. At processing block 310, a CTI is generated of size N×N with $f_\eta(m,n) = \eta$, where $\eta$ is the gray level=0, $1/G_l$, $2/G_l$, ..., $G_l/G_l$. Assuming an eight bit screen design, $G_l$ would be equal to 255. At processing block 320, an initial halftone image is generated for gray level 0 with all pixel values set to minimum absorptance level i.e. $\alpha_1$ (e.g., g of size N×N with $g_{0-initial}(m,n)=0$). At processing block 330, the auto-correlation function $c\widetilde{pp}[m,n]$ is computed. At processing block 340, pixel error processing is performed.

Figure 4:
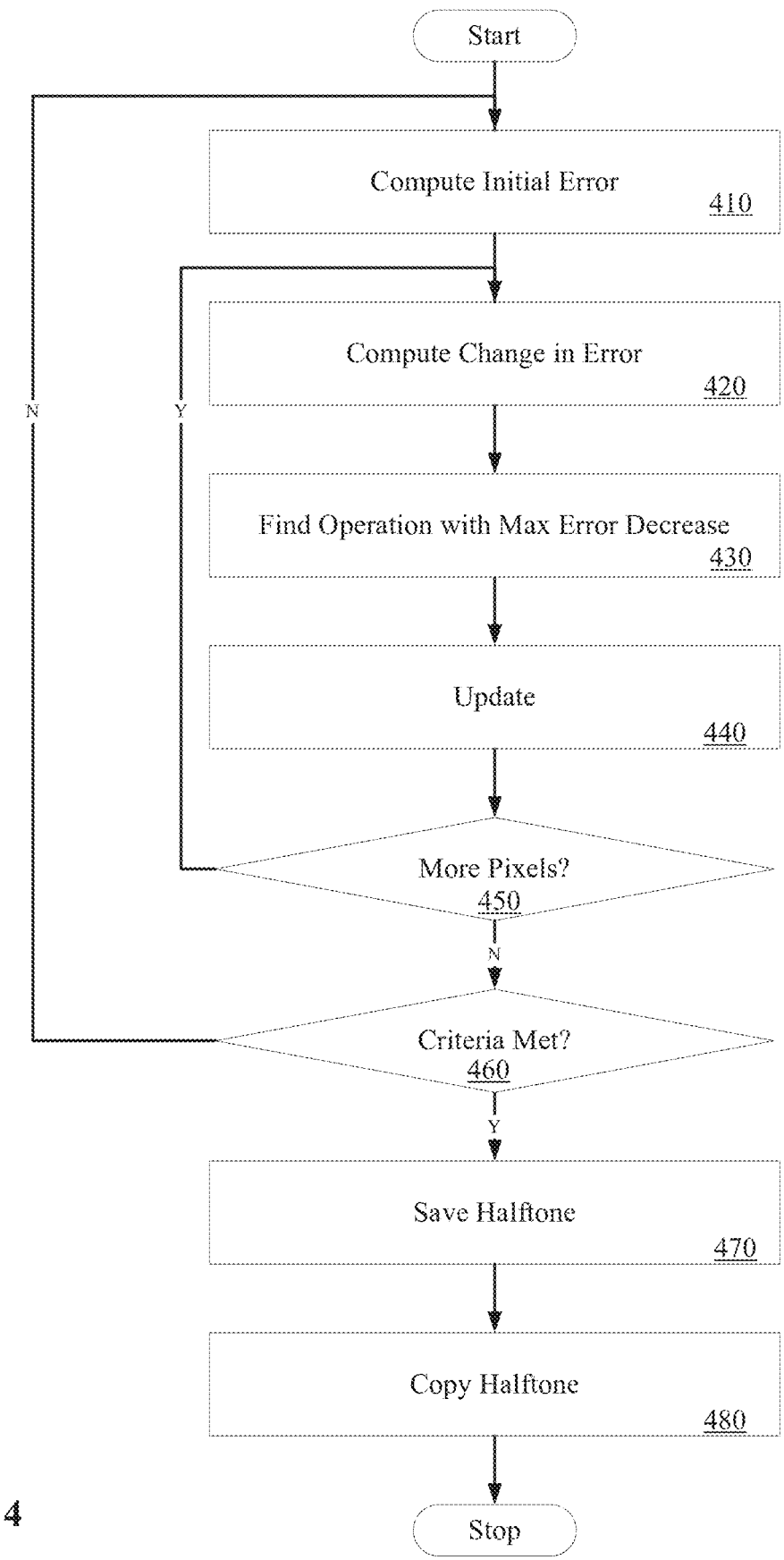
FIG. 4 is a flow diagram illustrating a further of embodiment of a multi-bit screening process.

FIG. 4 is a flow diagram illustrating one embodiment of performing pixel error processing. At processing block 410, the initial error $c\widetilde{pe}[m,n]$ between $f_\eta(m,n)$ and $g_{\eta-initial}(m,n)$ is computed. At processing block 420, a change in $c\widetilde{pe}[m,n]$ is computed for a pixel. The change in $c\widetilde{pe}[m,n]$ is computed by toggling pixel $g_{\eta-initial}(m,n)$ with all the possible output states as and swapping pixel $g_{\eta-initial}(m,n)$ with all of the neighbors. In another embodiment, only a subset of absorptance levels are used during the toggle operation.

In one embodiment, both toggle and swap operations are performed only at locations that satisfy the stacking constraint. In such an embodiment, the stacking constraint specifies that output states for each pixel of the array are the same or higher relative to the output states for the halftone patterns for gray levels lower than the current levels. Output states increase until they reach the maximum output state, at which time they remain the same for all higher gray levels.

At processing block 430, the operation with maximum error decrease in $\Delta\epsilon$ is found for that pixel location. If there is no change in the error, then the next pixel is processed. At processing block 440, $c\widetilde{pe}[m,n]$ and $g_{\eta-initial}(m,n)$ are updated reflecting the accepted change: $c\widetilde{pe}[m,n]' = c\widetilde{pe}[m,n] + a_i c\widetilde{pp}[m-m_i, n-n_i]$. At decision block 450, it is determined whether there are one or more additional pixels to process. If additional pixels are to be processed, the next pixel is processed according to processing blocks 420-440, described above.

However, if no more pixels need to be processed, it is determined whether an end criteria has been met, decision block 460. In one embodiment, the criteria have been met when no significant decrease in error is observed. At processing block 470, the gray level $g_{\eta-initial}$ is saved as the final halftone ($g_\eta$) for gray level $\eta$. At processing block 480, the saved halftone ($g_\eta$) is copied so that it can be used as initial halftone image for the next gray level (e.g., $g_{\eta+1-initial}$).

Figures 5, 6:
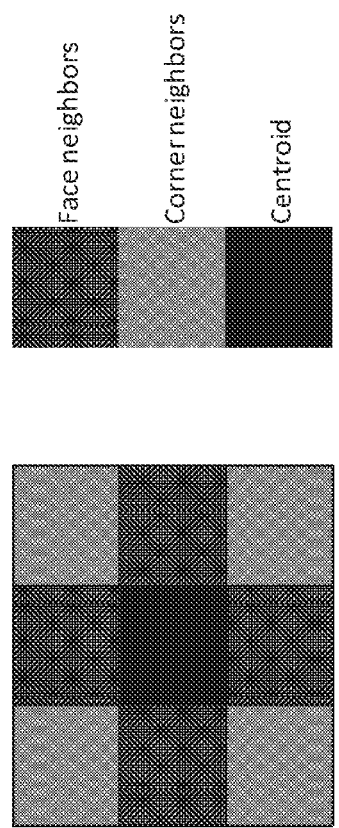
FIG. 5 illustrates one embodiment of a distance map.
FIG. 6 illustrates one embodiment of a neighborhood map.

Referring back to FIG. 3, an average minimum Euclidean distance between all non connected ON pixels is calculated, once the pixel error processing has been performed, processing block 350. It should be understood that ON pixel refers to any isolated or group of connected non zero absorptance level pixels. In one embodiment, a Euclidean distance is measured between two pixel locations. FIG. 5 illustrates one embodiment of an image having a center pixel being ON, and the corresponding Euclidean distance map.

In a further embodiment, the distance map may be represented by a neighborhood map that categorizes the neighbors into face neighbors and corner connected neighbors. FIG. 6 illustrates one embodiment of a neighborhood map. Referring back to FIG. 5, the distance map shows a distance of 1 between the centroid and the face neighbors, and 1.4 between the centroid and the corner neighbors.

Referring back to FIG. 3, it is determined, after calculating the average Euclidean distance, whether an average minimum distance between ON pixels reaches (e.g., less than or equal) a user defined minimum ($D_{min}$), decision block 360. If the minimum distance has not reached $D_{min}$, it is determined whether there are one or more additional gray levels to process, decision block 370.

If there are additional gray levels to process, control is returned to processing block 310 where the next gray level is processed. When the next gray level is selected at decision block, the CTI is updated to $f_{\eta+1}(m,n) = \eta+1$ at block 310, and the initial HTI $g_{\eta+1-initial} = g_\eta$ at block 320 and processed through pixel error processing block 340, as discussed above.

Figure 7:
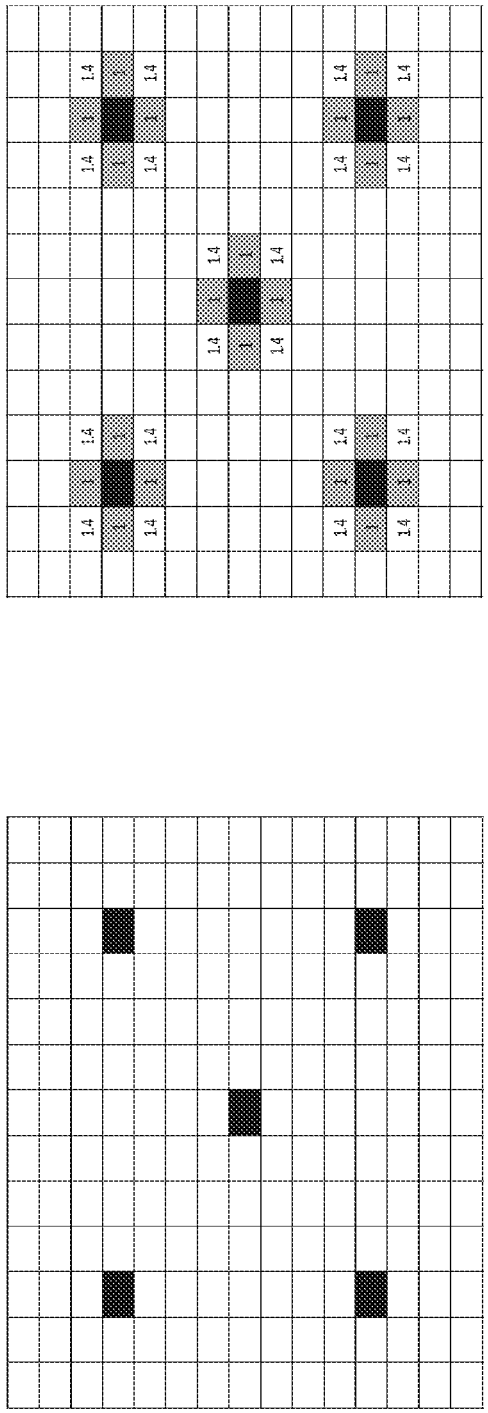
FIGS. 7A-7C illustrate embodiments of a seed pattern.

However if at decision block 360, it is determined that the minimum distance has reached $D_{min}$, the current gray level screen is stored as a seed pattern, processing block 380. FIG. 7A illustrates one embodiment of a gray level screen stored as a seed pattern. Once the seed pattern is stored, the nearest neighbor locations for every centroid in the seed pattern are identified.

Figure 8:
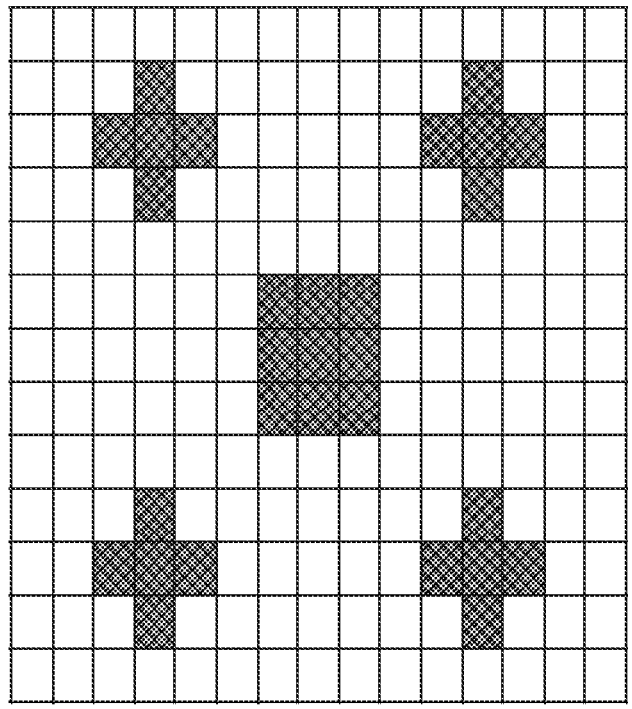
FIGS. 8A and 8B illustrate embodiments of a valid pixel location map.
Figure 8:
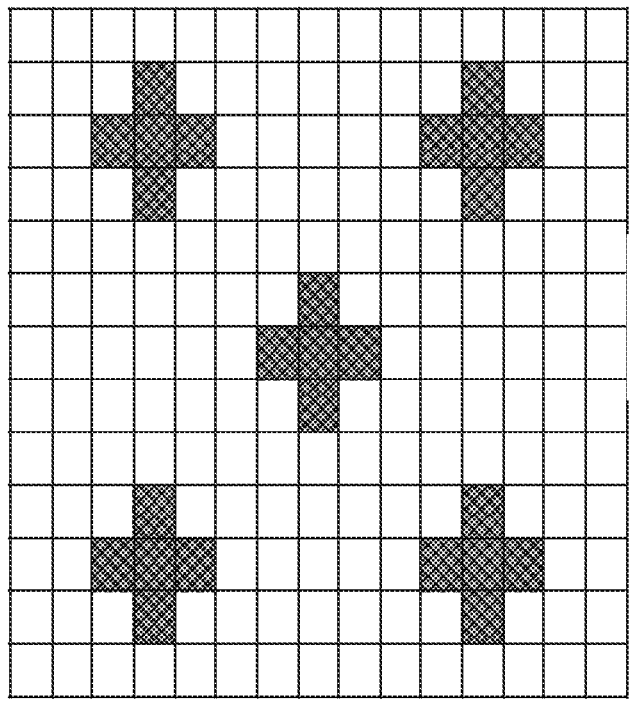

At processing block 390, the nearest neighbor locations, along with the centroid locations, are passed to a valid pixel location map. In one embodiment, the valid pixel location map provides location information for subsequent pixel error processing for the PELS at which the process can perform toggle or swap operations. In another embodiment a only subset of all of the valid pixel locations is used. In a further embodiment, the valid pixel location map is the same size as the halftone mask. FIG. 7B illustrates one embodiment of a seed pattern with nearest neighbors identified. FIG. 8A illustrates one embodiment of the corresponding valid pixel location map.

Once the valid pixel location map has been established, control is passed back to decision block 370, where it is again determined whether there are additional gray levels to process. If there are additional gray levels to process, control is returned to processing block 310 where the next gray level is processed. When the next gray level is selected, the CTI and HTI are again updated and processed through pixel error processing block 340.

However, during pixel error processing for each subsequent gray level, the toggle and swap operations are performed only at pixel locations indicated in the valid pixel location map. In one embodiment, toggle and swap operations are performed for the nearest neighbors of a centroid. Once all of the nearest neighbors of a centroid are used (e.g., PELs at the highest intensity level or largest dot size) the next nearest neighbors of the centroids are identified. These new locations are subsequently passed to the valid pixel location map. FIG. 7C illustrates one embodiment of a seed pattern after several gray levels. FIG. 8B illustrates one embodiment of the corresponding valid pixel location map.

Referring back to FIG. 3, if no additional gray tones are available to process, a multi-bit halftone screen or LUT is created that includes values generated from the DMSSA algorithm, processing block 395. In one embodiment, the halftone LUT is constructed from the resulting DMSSA patterns for each gray level.

Figure 9:
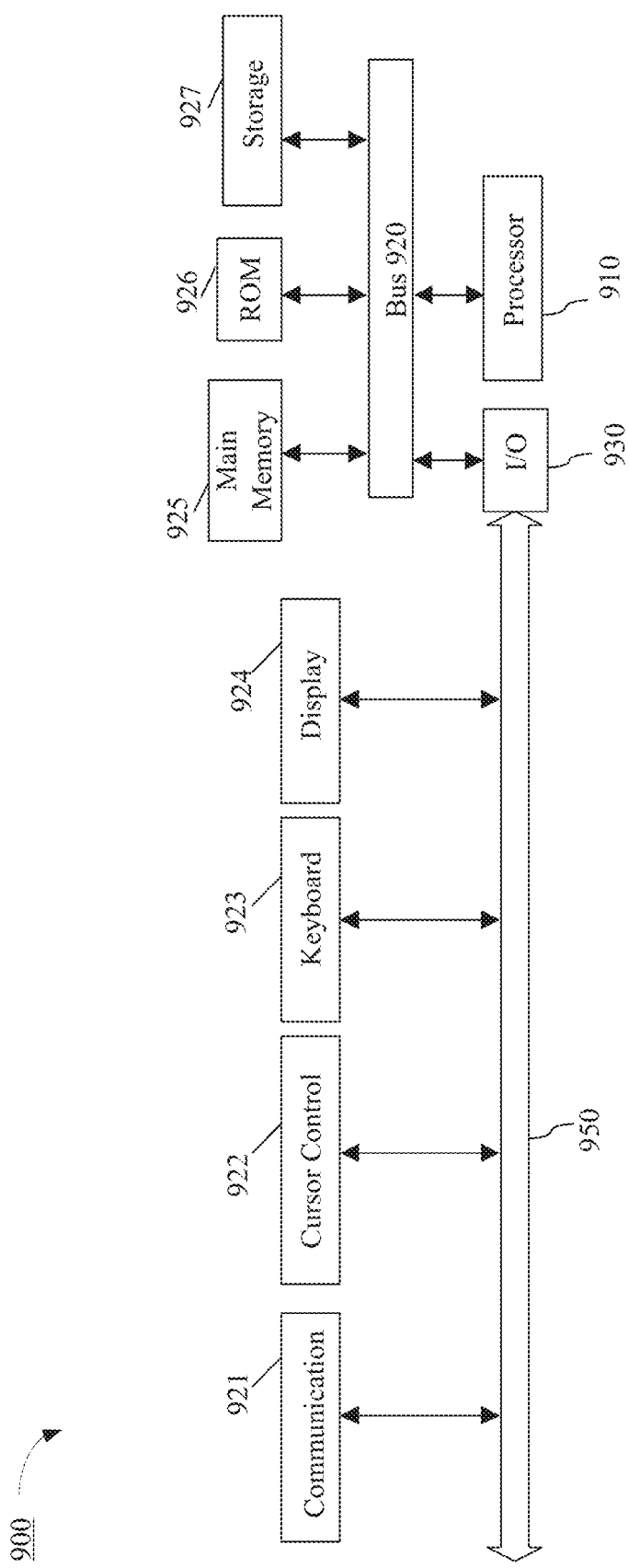
FIG. 9 illustrates one embodiment of a computer system.

FIG. 9 illustrates a computer system 900 on which print controller 140 and/or host system 110 may be implemented.

Computer system 900 includes a system bus 920 for communicating information, and a processor 910 coupled to bus 920 for processing information.

Computer system 900 further comprises a random access memory (RAM) or other dynamic storage device 925 (referred to herein as main memory), coupled to bus 920 for storing information and instructions to be executed by processor 910. Main memory 925 also may be used for storing temporary variables or other intermediate information during execution of instructions by processor 910. Computer system 900 also may include a read only memory (ROM) and or other static storage device 926 coupled to bus 920 for storing static information and instructions used by processor 910.

A data storage device 925 such as a magnetic disk or optical disc and its corresponding drive may also be coupled to computer system 900 for storing information and instructions. Computer system 900 can also be coupled to a second I/O bus 950 via an I/O interface 930. A plurality of I/O devices may be coupled to I/O bus 950, including a display device 924, an input device (e.g., an alphanumeric input device 923 and or a cursor control device 922). The communication device 921 is for accessing other computers (servers or clients). The communication device 921 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A non-transitory article of manufacture comprising a machine-readable medium including data that, when accessed by a machine, cause the machine to perform:
   generating a multi-bit hybrid halftone screen by:
   generating a Continuous Tone Image (CTI) with all pixel values same as a first gray level;
   generating an initial Half Tone Image (HTI) with all pixel values equal to minimum absorptance level; and
   computing a change in pixel error for a first pixel by:
   identifying a first pixel indicated in a valid pixel map;
   toggling the first pixel with all the possible output states as long as the result of the toggling of the first pixel satisfies a stacking constraint; and
   swapping the first pixel with all neighbor pixels indicated in the valid pixel map as long as the result of the swapping of the first pixel satisfies the stacking constraint;
   calculating an average minimum Euclidean distance between all ON pixels in the initial HTI; and
   determining if the distance is less than or equal to a predetermined minimum distance;
   wherein the distance is represented by a neighborhood map that categorizes neighbors into face neighbors and corner connected neighbors.

2. The article of manufacture of claim 1 comprising a machine-readable medium including data that, when accessed by a machine, further cause the machine to perform finding an operation with maximum error decrease for the first pixel after computing the change in pixel error for the first pixel.

3. The article of manufacture of claim 2 comprising a machine-readable medium including data that, when accessed by a machine, further cause the machine to perform updating the HTI and the change in pixel error for the first pixel.

4. The article of manufacture of claim 3 comprising a machine-readable medium including data that, when accessed by a machine, further cause the machine to perform:
   determining if there are additional pixels to process upon updating the HTI and the change in pixel error for the first pixel; and
   determining if an end criteria has been met upon determining that there are no additional pixels to process.

5. The article of manufacture of claim 1 comprising a machine-readable medium including data that, when accessed by a machine, further cause the machine to perform:
   computing a change in pixel error for a second pixel indicated in the valid pixel map if there are additional pixels to process;
   finding an operation with maximum error decrease for the second pixel if the operation at second pixel satisfies the stacking constraint; and
   updating the HTI and the change in pixel error for the second pixel.

6. The article of manufacture of claim 4 comprising a machine-readable medium including data that, when accessed by a machine, further cause the machine to perform computing a change in pixel error for the first pixel if the end criteria has not been met.

7. The article of manufacture of claim 4 comprising a machine-readable medium including data that, when accessed by a machine, further cause the machine to perform:
   saving the updated HTI as a final halftone screen for that gray level if the end criteria has been met;
   copying the saved final halftone screen as an initial HTI for the next gray level; and
   updating the CTI pixel values with next gray level till the final gray value is reached.

8. The article of manufacture of claim 1 comprising a machine-readable medium including data that, when accessed by a machine, further cause the machine to perform storing a current gray level screen as a seed pattern.

9. The article of manufacture of claim 8 comprising a machine-readable medium including data that, when accessed by a machine, further cause the machine to perform passing centroid locations and its nearest neighbor locations to the valid pixel location map.

10. A system comprising:
a processor to generating a multi-bit halftone screen by
generating a Continuous Tone Image (CTI) with all pixel values same as a first gray level,
generate an initial Half Tone Image (HTI) with all pixel values equal to minimum absorptance level and compute a change in pixel error for a first pixel by identifying a first pixel indicated in a valid pixel map, toggling the first pixel with all the possible output states as long as the result of the toggling of the first pixel satisfies a stacking constraint and swapping the first pixel with all neighbor pixels in the valid pixel map as long as the result of the swapping of the first pixel satisfies the stacking constraint,
calculates an average minimum Euclidean distance between all ON pixels in the initial HTI and determines if the distance is less than or equal to a predetermined minimum distance;
wherein the distance is represented by a neighborhood map that categorizes neighbors into face neighbors and corner connected neighbors.

11. The system of claim 10 wherein the processor finds an operation with maximum error decrease for the first pixel after computing the change in pixel error for the first pixel.

12. The system of claim 11 wherein the processor updates the HTI and the change in pixel error for the first pixel.

13. The system of claim 12 wherein the processor determine if there are additional pixels to process upon updating the HTI and the change in pixel error for the first pixel and determines if an end criteria has been met upon determining that there are no additional pixels to process.

14. The system of manufacture of claim 10 wherein the processor identifies a second pixel indicated in the valid pixel map, toggles the second pixel with all the possible output states and swaps the second pixel with all neighbor pixels indicated in the valid pixel map as long as the result of the operation of the second pixel satisfies the stacking constraint.

15. The system of claim 13 wherein the processor computes a change in pixel error for the first pixel if the end criteria have not been met.

16. The system of claim 13 wherein the processor saves the updated HTI as a final halftone screen for that gray level if the end criteria has been met, copies the saved final halftone screen as an initial HTI for the next gray level and updates the CTI pixel values with next gray level till the final gray value is reached.

17. The system of claim 10 wherein the processor stores a current gray level screen as a seed pattern.

18. The system of claim 17 wherein the processor passes centroid locations and its nearest neighbor locations to the valid pixel location map.

19. A method comprising:
Generating a multi-bit hybrid halftone screen by:
generating a Continuous Tone Image (CTI) with all pixel values same as a first gray level;
generating an initial Half Tone Image (HTI) with all pixel values equal to minimum absorptance level; and
computing a change in pixel error for a first pixel by:
identifying a first pixel indicated in a valid pixel map;
toggling the first pixel with all the possible output states as long as the result of the toggling of the first pixel satisfies a stacking constraint; and
swapping the first pixel with all neighbor pixels indicated in a valid pixel map as long as the result of the swapping of the first pixel satisfies the stacking constraint;
calculating an average minimum Euclidean distance between all ON pixels in the initial HTI; and
determining if the distance is less than or equal to a predetermined minimum distance,
wherein the distance is represented by a neighborhood map that categorizes neighbors into face neighbors and corner connected neighbors.

20. The method of claim 19 further comprising finding an operation with maximum error decrease for the first pixel after computing the change in pixel error for the first pixel.

21. The method of claim 20 further comprising updating the HTI and the change in pixel error for the first pixel.

22. The method of claim 21 further comprising:
determining if there are additional pixels to process upon updating the HTI and the change in pixel error for the first pixel; and
determining if an end criteria has been met upon determining that there are no additional pixels to process.

23. The method of claim 19 further comprising:
identifying a second pixel indicated in the valid pixel map;
toggling the second pixel with all the possible output states as long as the result of the toggling of the second pixel satisfies the stacking constraint; and
swapping the second pixel with all neighbor pixels indicated in the valid pixel map as long as the result of the swapping of the second pixel satisfies the stacking constraint.

* * * * *